United States Patent
Evers

(10) Patent No.: US 7,376,947 B2
(45) Date of Patent: May 20, 2008

(54) COMPUTER SYSTEM AND METHOD FOR SECURE INSTALLATION AND OPERATION OF SOFTWARE

(75) Inventor: Richard T. Evers, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 10/785,579

(22) Filed: Feb. 23, 2004

(65) Prior Publication Data

US 2005/0188369 A1    Aug. 25, 2005

(51) Int. Cl.
G06F 9/445    (2006.01)
G06F 9/44    (2006.01)

(52) U.S. Cl. .................. 717/174; 717/176; 717/177; 717/178

(58) Field of Classification Search ........ 717/168–178; 715/851; 711/152; 707/3, 104.1
See application file for complete search history.

(56) References Cited

U.S. PATENT DOCUMENTS

| | | | | |
|---|---|---|---|---|
| 5,537,592 | A * | 7/1996 | King et al. ................. | 707/200 |
| 5,991,778 | A * | 11/1999 | Starek et al. ............... | 707/205 |
| 6,026,474 | A * | 2/2000 | Carter et al. ................ | 711/202 |
| 6,205,527 | B1 * | 3/2001 | Goshey et al. .............. | 711/162 |
| 6,314,437 | B1 * | 11/2001 | Starek et al. ............... | 707/206 |
| 6,321,219 | B1 * | 11/2001 | Gainer et al. ................... | 707/3 |
| 6,351,850 | B1 * | 2/2002 | van Gilluwe et al. ....... | 717/175 |
| 6,377,958 | B1 * | 4/2002 | Orcutt ........................ | 707/200 |
| 6,418,449 | B1 * | 7/2002 | Chen et al. .............. | 707/104.1 |
| 6,490,723 | B1 * | 12/2002 | Bearden et al. ............. | 717/174 |
| 6,519,762 | B1 * | 2/2003 | Colligan et al. ............ | 717/170 |
| 6,618,857 | B1 * | 9/2003 | Zimniewicz et al. ........ | 717/175 |
| 6,658,435 | B1 * | 12/2003 | McCall ....................... | 707/204 |
| 6,744,450 | B1 * | 6/2004 | Zimniewicz et al. ........ | 715/841 |
| 6,807,665 | B2 * | 10/2004 | Evans et al. ................ | 717/175 |
| 2002/0019935 | A1 * | 2/2002 | Andrew et al. ............. | 713/165 |
| 2002/0129277 | A1 * | 9/2002 | Caccavale ................... | 713/201 |
| 2004/0083381 | A1 * | 4/2004 | Sobel et al. ................ | 713/200 |
| 2004/0133761 | A1 * | 7/2004 | Goodman ................... | 711/210 |

(Continued)

OTHER PUBLICATIONS

Han et al., Secure multicast software delivery, IEEE, Jun. 14-16, 2000 pp. 207-212.*

(Continued)

Primary Examiner—Wei Zhen
Assistant Examiner—Satish S Rampuria
(74) Attorney, Agent, or Firm—Kirk D. Houser; Eckert Seamans Cherin & Mellott, LLC

(57) ABSTRACT

A computer system provides for the secure installation and operation of software. The computer system includes a platform, such as a personal computer, having a processor and the Microsoft® Windows® operating system. The computer system also includes a first drive, such as a network, DVD or CD-ROM drive, adapted for access by the processor, and a second drive, such as a hard disk, adapted for access by the processor. The second drive includes an NT File Structure logical volume. The computer system further includes an installer operatively associated with the first drive. The installer cooperates with the processor to write a Primary Data Stream file to the NT File Structure logical volume, to associate data with the Primary Data Stream file, and to write the associated data to the NT File Structure logical volume as an Alternate Data Stream file.

19 Claims, 4 Drawing Sheets

U.S. PATENT DOCUMENTS

| | | | |
|---|---|---|---|
| 2004/0143736 A1* | 7/2004 | Cross et al. | 713/165 |
| 2004/0230599 A1* | 11/2004 | Moore et al. | 707/102 |
| 2005/0097549 A1* | 5/2005 | Chu et al. | 717/178 |
| 2005/0138110 A1* | 6/2005 | Redlich et al. | 709/201 |

OTHER PUBLICATIONS

Chu-Hsing et al., One-time installation with traitors tracing for copyright programs, IEEE, Oct. 16-19, 2001 pp. 149-155.*

Hui et al., A secure mobile IP implementation for windows-based wireless LAN stations using special network drivers, IEEE, vol. 1, Sep. 7-10, 2003 pp. 453-459 vol. 1.*

Han et al., A scheme to construct global file system, IEEE, Dec. 3-6, 2001 pp. 206-212 vol. 2.*

Richter et al., A File System for the 21st Century: Previewing the Windows NT 5.0 File System, http://www.microsoft.com/msj/1198/ntfs/ntfs.aspx, Nov. 1998, p. 1-16.*

Seifried, M-034: Window File Wiping Utilities Miss Alternate Data Streams, google.com, Jan. 30, 2002, p. 1-7.*

Berghel et al., Phishing in Alternate Data Streams, ACM, Feb. 6, 2004, p. 1-9.*

NTFS.com, NTFS general information Boot Sector, NTFS.com, 1998-2000.*

Enclaves: enabling secure collaboration over the Internet, Li Gong, Selected Areas in Communications, IEEE Journal on, vol. 15 Issue: 3 Apr. 1997, IEEE, pp. 567-575.*

Protection reconfiguration for reusable software, Jensen, C.D.; Hagimont, D., Software Maintenance and Reengineering, 1998. Proceedings of the Second Euromicro Conference on, Mar. 8-11, 1998, IEEE, pp. 74-80.*

Hiding program slices for software security, Xiangyu Zhang; Gupta, R., Code Generation and Optimization, 2003. CGO 2003. International Symposium on, Mar. 23-26, 2003, IEEE, pp. 325-336.*

Carvey, H., "The Dark Side of NTFS (Microsoft's Scarlet Letter)", http://patriot.net/~carvdawg/docs/dark_side.html, Oct. 30, 2003, pp. 1-12.

Red Hat, Inc., "Cygwin" TM, http:\\www.redhat.com/software/cygwin/, Feb. 11, 2004, pp. 1-2.

Computer Knowledge, "Virus Types and Methods: NTFS ADS Viruses", http://www.cknow.com/vtutor/vtntfsads.htm, Feb. 3, 2004, pp. 1-4.

Crucial Security, Inc., "Free Software Downloads", http://www.crucialsecurity.com/downloads.html, Feb. 3, 2004, 4 pp.

JSI, Inc., "0483>> How can I hide files from Explorer and/or Dir?", http://www.jsiinc.com/SUBA/tip0400/rh0483.htm, Oct. 30, 2003, pp. 1-2.

JSI, Inc., "2808 >> Alternate Data Stream tool.", http://www.jsiinc.com/SUBF/tip2800/rh2808.htm, Oct. 30, 2003, pp. 1-2.

Pearson Technology Centre, "InformIT.com: Security", http://www.informit.com/isapi/guide~security/seq_id~15/guide/contenL.asp, Oct. 30, 2003, pp. 1-6.

LSOFT Technologies Inc., "NTFS—New Technology File System designed for Windows NT, 2000, XP", http:\\www.ntfs.com, Oct. 30, 2003, pp. 1-2.

LSOFT Technologies Inc. "NTFS Multiple Data Streams", http://www.ntfs.com/ntfs-multiple.htm, Oct. 30, 2003, p. 1.

H. Berghel et al., Association for Computing Machinery, "Phishing in Alternate Data Streams", http://www.acm.org/~hlb/col-edit/digital_village/apr-04/dv_4-04.html, Jan. 6, 2004, 9 pp.

Peter Szor, Symantec Security Responses Homepage, "W2K.Stream", http://web.archive.org/web/20030625134400/http://www.sarc.com/avcenter/venc/data/pf/w2k.stream.html, Jun. 25, 2003, 3 pp.

VMware, Inc., "VMware Workstation User's Manual Version 3.2", Dec. 16, 2002, 41 pp.

Apple Computer, Inc., Apple Developer Connection, "File Forks", http://developer.apple.com/documentation/mac/Files/Files-14.html, Jul. 2, 1996, 3 pp.

Anonymous, "Installation (computer programs)", Internet Article, Wikipedia Retrieved from the Internet: URL:http://en.wikipedia.org/wiki/Installation_%28computer_programs%29>, Feb. 2006, 2pp.

H. Carvey, "NTFS Alternate Data Streams", Information Security Bulletin, Feb. 2001, pp 27-30.

Microsoft Press, "The Windows Interface Guidelines for Software Design", 1995, 10 pp.

* cited by examiner

COMPUTER SYSTEM AND METHOD FOR SECURE INSTALLATION AND OPERATION OF SOFTWARE

BACKGROUND OF THE INVENTION

1. Field of the Invention

This invention pertains generally to methods for installing software and, more particularly, to methods for the secure installation and operation of software applications. The invention also relates to systems for the secure installation and operation of software.

2. Background Information

Known software installation products for Microsoft® Windows®-based platforms are believed to be designed to be generic in nature and do not take advantage of media-specific properties that are not common across all media types. Furthermore, known software products, in general, are believed to be designed to be generic in nature and do not take advantage of media-specific properties that are not common across all media types.

Alternate Data Streams (ADSs) have been available since the NT File Structure (NTFS) was first introduced. In NTFS, everything on disk is a file. For example, the metadata (e.g., eleven metadata files, such as $MFT, the Master File Table, are created in which NTFS stores data associated with disk management) is stored as a set of files. The Master File Table (MFT) is an index of every file on the NTFS logical volume. For each file, the MFT keeps a record containing attributes of information about the file.

It is known to employ an ADS as a secondary storage mechanism when file-specific MFT data exceeds 1,500 bytes. This is an automatic process within the Windows® operating system. It is also known for this operating system to automatically employ ADSs to store thumbnails of all image files stored on an NTFS logical volume. This process is enabled by default, and can be disabled through modification of the system registry. It is believed that no installer has been written to take advantage of NTFS ADSs because Windows®-based installation programs are written to work on FAT, FAT32 and NTFS volumes. Also, FAT and FAT32 volumes do not support ADSs.

Installation logs, application configuration files and other secure data may readily be accessed, archived, compressed, backed up, viewed, scanned, modified, manipulated or deleted by employing conventional techniques, such as, for example, standard system tools. Hence, these files are subject to possible accidental access, storage, modification, use or deletion. Moreover, these files are readily accessible to a user who might improperly seek to intentionally access, archive, view, modify, use or delete the contents. Accordingly, there is room for improvement in methods and systems for the secure installation and operation of software.

SUMMARY OF THE INVENTION

These needs and others are met by the invention, which provides a method for an installer to write a Primary Data Stream (PDS) file to an NT File Structure (NTFS) logical volume, associate data with the Primary Data Stream file, and write the associated data to the NT File Structure logical volume as an Alternate Data Stream file from that installer. This allows installation logs, application configuration data, and other application-specific and/or secure information to be safely hidden from view and protected from unsafe deletion or modification.

In accordance with one aspect of the invention, a method for secure installation and operation of software comprises: employing an NT File Structure logical volume; employing an installer; writing a Primary Data Stream file to the NT File Structure logical volume from the installer; associating data with the Primary Data Stream file; and writing the associated data to the NT File Structure logical volume as an Alternate Data Stream file from the installer.

The method may include selecting the data from the group comprising an installation log, an application configuration file, an error log, help information, and database information.

The method may include employing as the Primary Data Stream file an executable file.

The method may include creating a Primary Data Stream directory chain; writing the Primary Data Stream directory chain to the NT File Structure logical volume from the installer; writing the Primary Data Stream file to the Primary Data Stream directory chain in the NT File Structure logical volume from the installer; associating the data with the Primary Data Stream directory chain or the Primary Data Stream file by creating and closing the Alternate Data Stream file; and installing the associated data to the NT File Structure logical volume as the Alternate Data Stream file from the installer.

The method may include employing an installation file; defining in the installation file a Primary Data Stream directory chain, the Primary Data Stream file, the Alternate Data Stream file, and at least one information file; displaying the at least one information file from the installation file; creating the Primary Data Stream directory chain in the NT File Structure logical volume; copying the Primary Data Stream file from the installation file to the Primary Data Stream directory chain in the NT File Structure logical volume; and copying the Alternate Data Stream file from the installation file to the Primary Data Stream directory chain in the NT File Structure logical volume.

As another aspect of the invention, a computer system for secure installation and operation of software comprises: a processor; a first drive adapted for access by the processor; a second drive adapted for access by the processor, the second drive including an NT File Structure logical volume; and an installer operatively associated with the first drive, the installer cooperating with the processor to write a Primary Data Stream file to the NT File Structure logical volume, associate data with the Primary Data Stream file, and write the associated data to the NT File Structure logical volume as an Alternate Data Stream file.

The NT File Structure logical volume may include a directory chain or a system directory. The installer may install the Primary Data Stream file in the directory chain or the system directory of the NT File Structure logical volume.

The installer may cooperate with the processor to create a Primary Data Stream directory chain, to write the Primary Data Stream directory chain to the NT File Structure logical volume, to write the Primary Data Stream file to the Primary Data Stream directory chain in the NT File Structure logical volume, to associate the data with the Primary Data Stream directory chain or the Primary Data Stream file, and to install the associated data to the NT File Structure logical volume as the Alternate Data Stream file.

The processor may include a display. The NT File Structure logical volume may include a display utility. The display utility may cooperate with the processor to display the associated data from the Alternate Data Stream file in the NT File Structure logical volume on the display.

The installer may include an installation file including a Primary Data Stream directory chain, the Primary Data Stream file, the Alternate Data Stream file, and at least one information file. The installer may cooperate with the processor to display the at least one information file from the installation file to the display, to create the Primary Data Stream directory chain in the NT File Structure logical volume, to copy the Primary Data Stream file from the installation file to the Primary Data Stream directory chain in the NT File Structure logical volume, and to copy the Alternate Data Stream file from the installation file to the Primary Data Stream directory chain in the NT File Structure logical volume.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention is described in association with an installer for a DVD or compact disc (CD) drive (e.g., a CD-ROM drive), although the invention is applicable to a wide range of different media and/or different drives.

Figure 1:
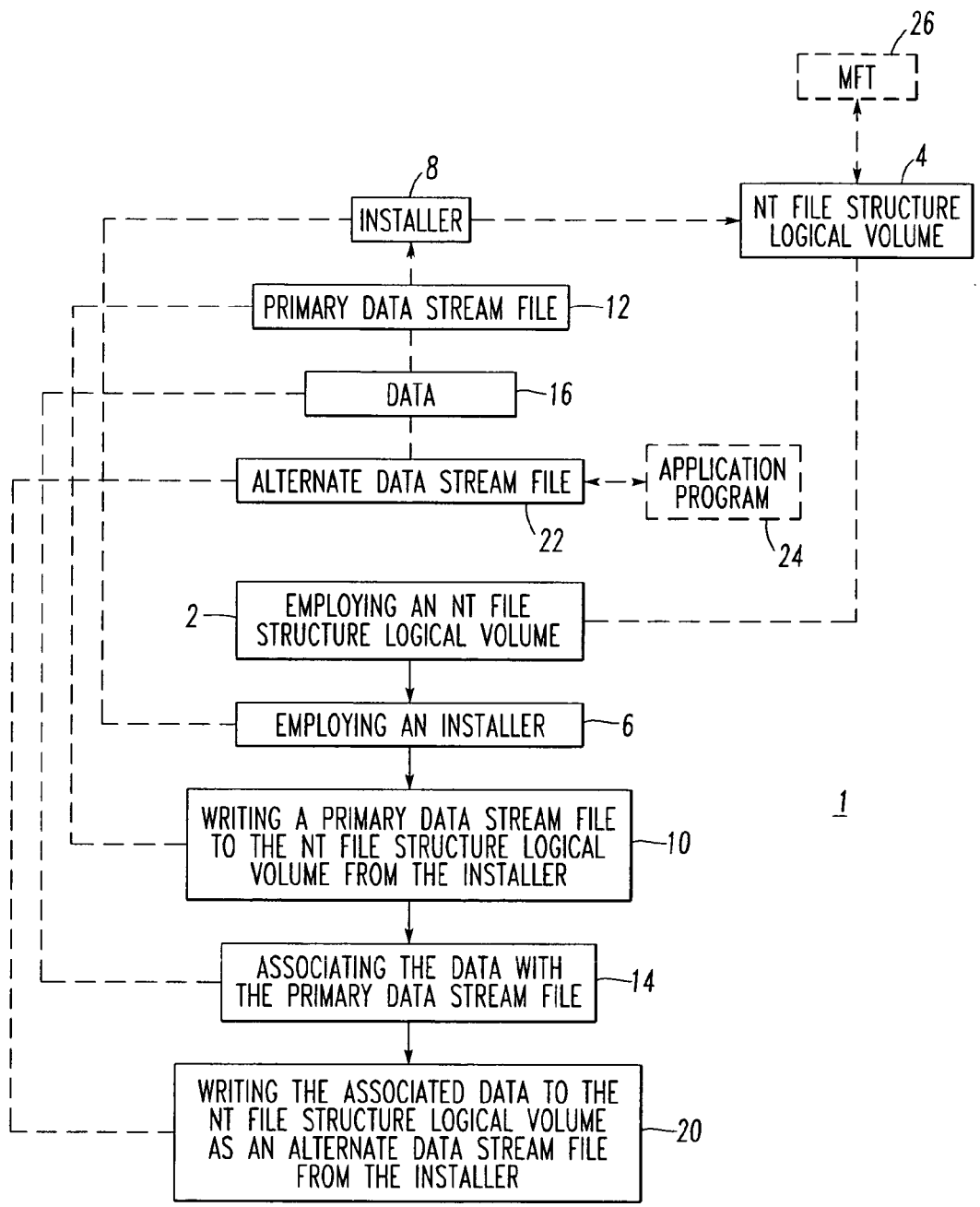
FIG. 1 is a flowchart of steps for the secure installation and operation of software in accordance with an embodiment of the invention.

Referring to FIG. 1, a flowchart 1 shows the steps for the secure installation and operation of software. First, at 2, an NT File Structure (NTFS) logical volume 4 is employed. Next, at 6, an installer 8 is employed. Then, at 10, a Primary Data Stream (PDS) file 12 is written to the NTFS logical volume 4 from the installer 8. Next, at 14, data 16 is associated with the PDS file 12. Finally, at 20, the associated data 16 is written to the NTFS logical volume 4 as an Alternate Data Stream (ADS) file 22 from the installer 8.

EXAMPLE 1

An application program 24 may be employed to write, read or otherwise manipulate the ADS file 22 from such application program after writing the associated data 16 to the NTFS logical volume 4 at step 20, above.

EXAMPLE 2

In addition to writing the (insecure) PDS file 12 to the NTFS logical volume 4 from the installer 8 at step 10, above, directory data (not shown) for that file 12 may also be written to the NTFS logical volume 4.

EXAMPLE 3

Installation logs, application configuration files and other secure data may be associated with one or more PDS (e.g., executable files) by writing the secure data as the NTFS ADS file 22. Associated files written as ADSs cannot be viewed using conventional techniques, cannot normally be deleted without deleting the associated visible PDS file 12, and normally can only be accessed by knowing the naming convention used to store the data 16. ADS files, such as file 22, can, however, be written to, read from and otherwise manipulated from within an originating software application, such as application program 24.

EXAMPLE 4

It is possible to delete associated ADS file(s) from PDS files (or PDS directories) from the command line by copying the PDS file (or PDS directory chain) to a FAT or FAT32 volume (not shown), and then copying the data from the FAT or FAT32 volume back to the NTFS logical volume, which overwrites the original data. Since FAT and FAT32 volumes do not support Alternate Data Streams, they will ignore any ADS file that is associated to the PDS file (or PDS directory) during the copy. Normally, Windows® installations including NTFS logical volumes rarely have FAT or FAT32 volumes attached. Additionally, most users will not realize that ADS file(s) have been associated to PDS files (or PDS directories) and will not try to circumvent the file protection that has been implemented.

This "feature" of losing ADS file(s) associated to PDS files (or PDS directories) during a copy to a FAT/FAT32 volume is of great value from a security standpoint. While it is rare to find a FAT/FAT32 volume attached to an NTFS logical volume, it is easy for a user to copy data to a FAT floppy disk (not shown), or copy data to an external hard drive or Flash RAM drive (e.g., through a USB port) (not shown). Here, only PDS files can be copied to a floppy disk.

If an external NTFS hard drive is connected to a workstation (not shown), then the user will be able to copy over PDS files and all associated ADS files. However, transporting and connecting an external hard drive is fairly visible; hence, the risk of an unscrupulous or unknowledgeable user doing this in secret is minimal.

Only PDS files can be copied to an external USB Flash RAM drive (e.g., card) (not shown) because the native file system is FAT and the overhead of NTFS is too high for such a limited device.

Taken as a whole, the ability to strip ADS files from PDS files during a copy to a FAT or FAT32 volume is a valuable security feature.

EXAMPLE 5

It is also possible to decouple ADS file(s) from PDS files (or PDS directories) from the command line under Windows® 2000 and XP with the following three commands: (1) copy PRIMARY.EXE TEMP.EXE; (2) type TEMP.EXE>PRIMARY.EXE; and (3) del TEMP.EXE.

The first command line makes a copy of the file PRIMARY.EXE, which is assumed to have associated ADS file(s). The second command line 'views' the PDS component of the file TEMP.EXE in a way that overwrites the file, PRIMARY.EXE, that has the associated ADS file(s). This will result in a new copy of PRIMARY.EXE that lacks the associated ADS file(s). Finally, the third command line simply deletes the temporary file, TEMP.EXE.

EXAMPLE 6

Third party applications are available that navigate through NTFS logical volumes to seek out PDS files and PDS directories that have associated ADS files. If a user is technically savvy about NTFS logical volumes and ADS files, then they can also find the utilities that will help them locate PDS files with associated ADS files. It is believed that relatively very few users know about Alternate Data Streams under NTFS. This includes software engineers, system administrators, power users and regular users. Hence, the risk of having a user view, delete or modify data stored as a regular PDS file is far greater than that of having an ADS file associated to a PDS file or PDS directory. Hence, the value of the disclosed method and computer system is considerable from a security standpoint.

EXAMPLE 7

Descriptive information about all files and directories (not shown) within the NTFS logical volume 4 are located in a Master File Table (MFT) 26. Each MFT file/directory entry (not shown) contains a data attribute (not shown) that is used to house pointers to ADS files, such as file 22. In taking this approach of associating a PDS file, such as file 12, or directory (not shown) with zero or more ADS files, such as file 22, through internal referencing through pointers (not shown), ADS files are effectively made invisible, and less prone to deletion and modification using standard system tools (not shown).

Figure 2:
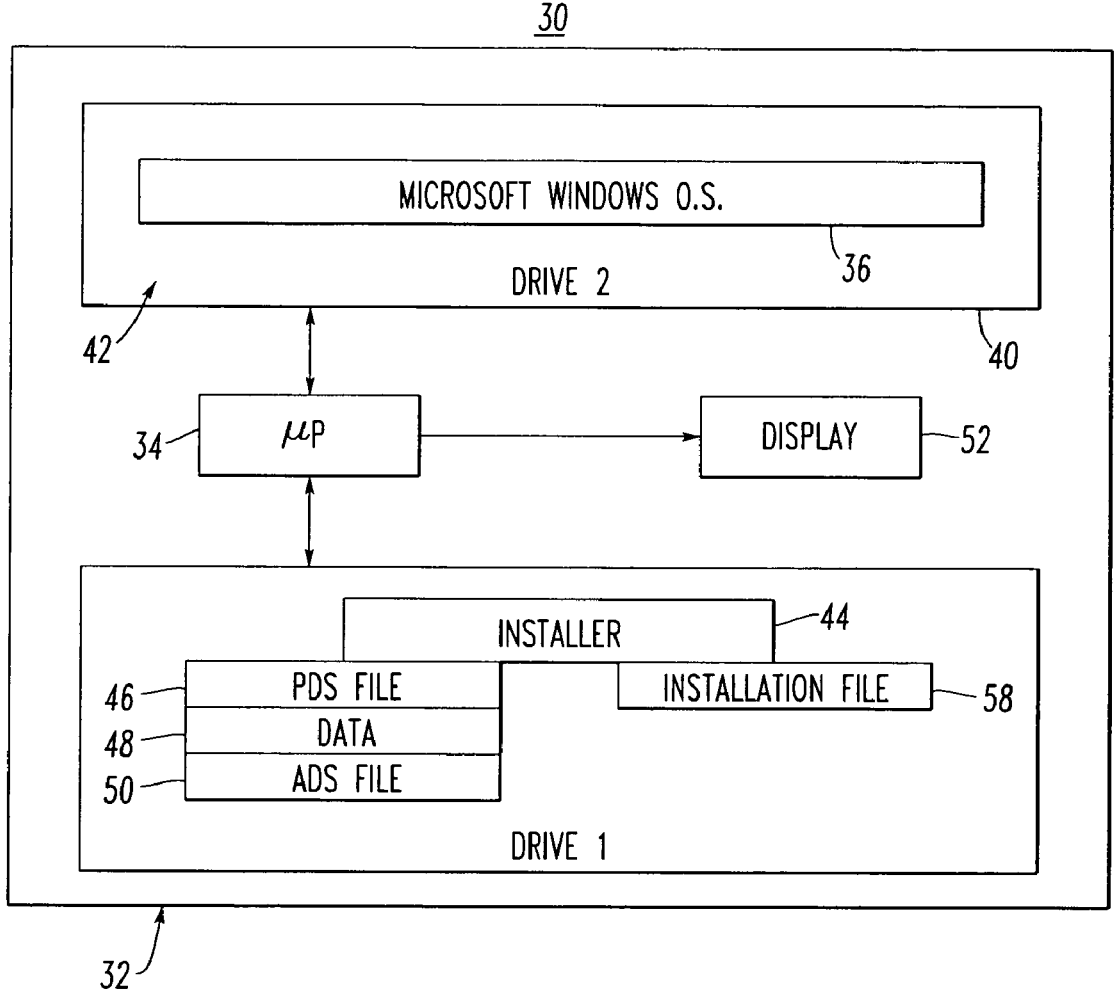
FIG. 2 is a block diagram of a computer system for secure installation and operation of software in accordance with another embodiment of the invention.

FIG. 2 shows a computer system 30 for secure installation and operation of software. The computer system 30 includes a suitable platform, such as a personal computer 32, workstation (not shown) or server (not shown), having a processor (μP) 34 and the Microsoft® Windows® operating system 36 (e.g., without limitation, Windows® XP Professional; Windows® XP Home; Windows® Server 2003; Windows® Small Business Server 2003; Windows® Storage Server 2003; Windows® 2000 Server; Windows® 2000 Professional; Windows® NT Workstation; Windows® NT Server; future versions of Windows® that support Alternate Data Streams).

The computer system 30 also includes a first drive, such as a DVD or CD-ROM drive 38, adapted for access by the processor 34, and a second drive, such as a hard disk 40, adapted for access by the processor 34. The second drive 40 includes an NTFS logical volume 42. The computer system 30 further includes an installer 44 operatively associated with the first drive 38. The installer 44 cooperates with the processor 34 to write a PDS file 46 to the NTFS logical volume 42, to associate data 48 with the PDS file 46, and to write the associated data 48 to the NTFS logical volume 42 as an ADS file 50.

The personal computer 32 includes a display 52 that is controlled by the processor 34. The PDS file 46 may be, for example, an executable file, which is adapted for execution by the processor 34.

EXAMPLE 8

Figure 3:
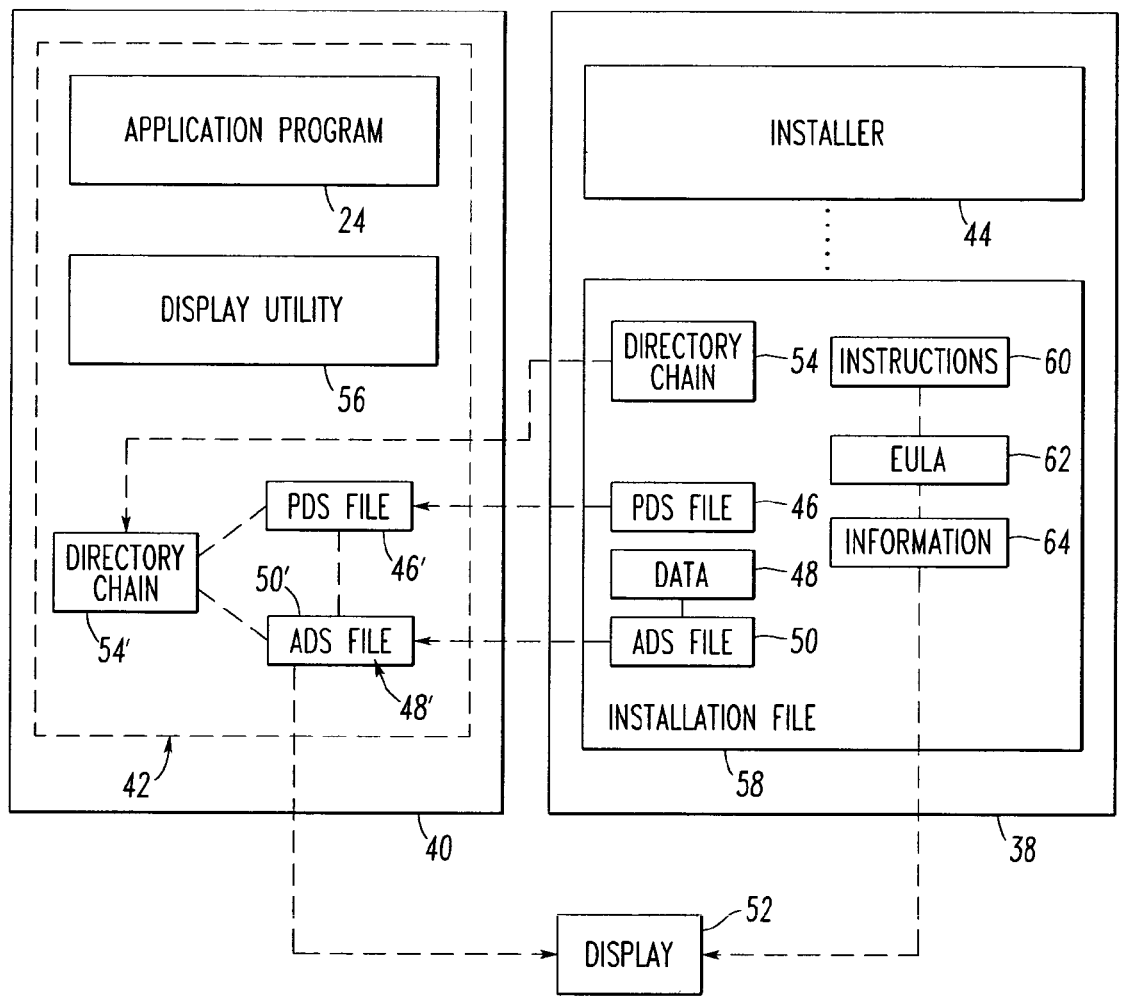
FIG. 3 is a block diagram of the NT File Structure logical volume and the installer of FIG. 2.

For example, the installer 44 of FIG. 3 creates a PDS file 46', writes data to that PDS file 46', closes the PDS file 46', creates an ADS file 50' associated to the PDS file 46' (or PDS directory), writes data 48' to the ADS file 50', and then closes the ADS file 50'. The association process occurs when the ADS file 50' is first created, and completes when the ADS file 50' is closed.

Continuing to refer to FIG. 3, the disk drive 40 with the NTFS logical volume 42 and the CD-ROM drive 38 with the installer 44 and an associated installation file 58 are shown. The installer 44 copies a directory chain 54 (e.g., without limitation, C:\Program Files\Company_Name\Electronic_Handheld_Device, C:\Program Files\Company_Name\Electronic_Handheld_Device_JDE_3.7) or system directory (e.g., without limitation, C:\WINNT) from the installation file 58 to the NTFS logical volume 42 as directory chain 54' or system directory. The NTFS logical volume 42 also includes a PDS file 46', which is copied by the installer 44 from the PDS file 46 of the drive 38. The file 46 is part of or is referenced by the installation file 58. Similarly, the NTFS logical volume 42 further includes an ADS file 50' having data 48', which file 50' is copied by the installer 44 from the ADS file 50 of the drive 38. The file 50 is part of or is referenced by the installation file 58. In this manner, the installer 44 installs the PDS file 46' and the ADS file 50' in that directory chain 54'.

In summary, the installer 44 cooperates with the processor 34 of FIG. 2 to create the PDS directory chain 54', to write the PDS directory chain 54' to the NTFS logical volume 42, to write the PDS file 46' to the PDS directory chain 54' in the NTFS logical volume 42, to associate the data 48' with the PDS directory chain 54' or the PDS file 46', and to install the associated data 48' to the NTFS logical volume 42 as the ADS file 50'.

The NTFS logical volume 42 includes the application program 24, which cooperates with the processor 34 of FIG. 2 to write, read or manipulate the ADS file 50'. The NTFS logical volume 42 may also include a suitable display utility 56, which cooperates with the processor 34 to display the associated data 48' from the ADS file 50' in the NTFS logical volume 42 on the display 52.

As shown, the installation file 58 includes the PDS file 46, the ADS file 50, installation instructions 60, the PDS directory chain 54, an End User License Agreement (EULA) 62, and one or more other information files 64.

The installer 44 cooperates with the processor 34 of FIG. 2 to display the installation instructions 60, the EULA 62 and/or the one or more information files 64 from the installation file 58 to the display 52.

Figure 4:
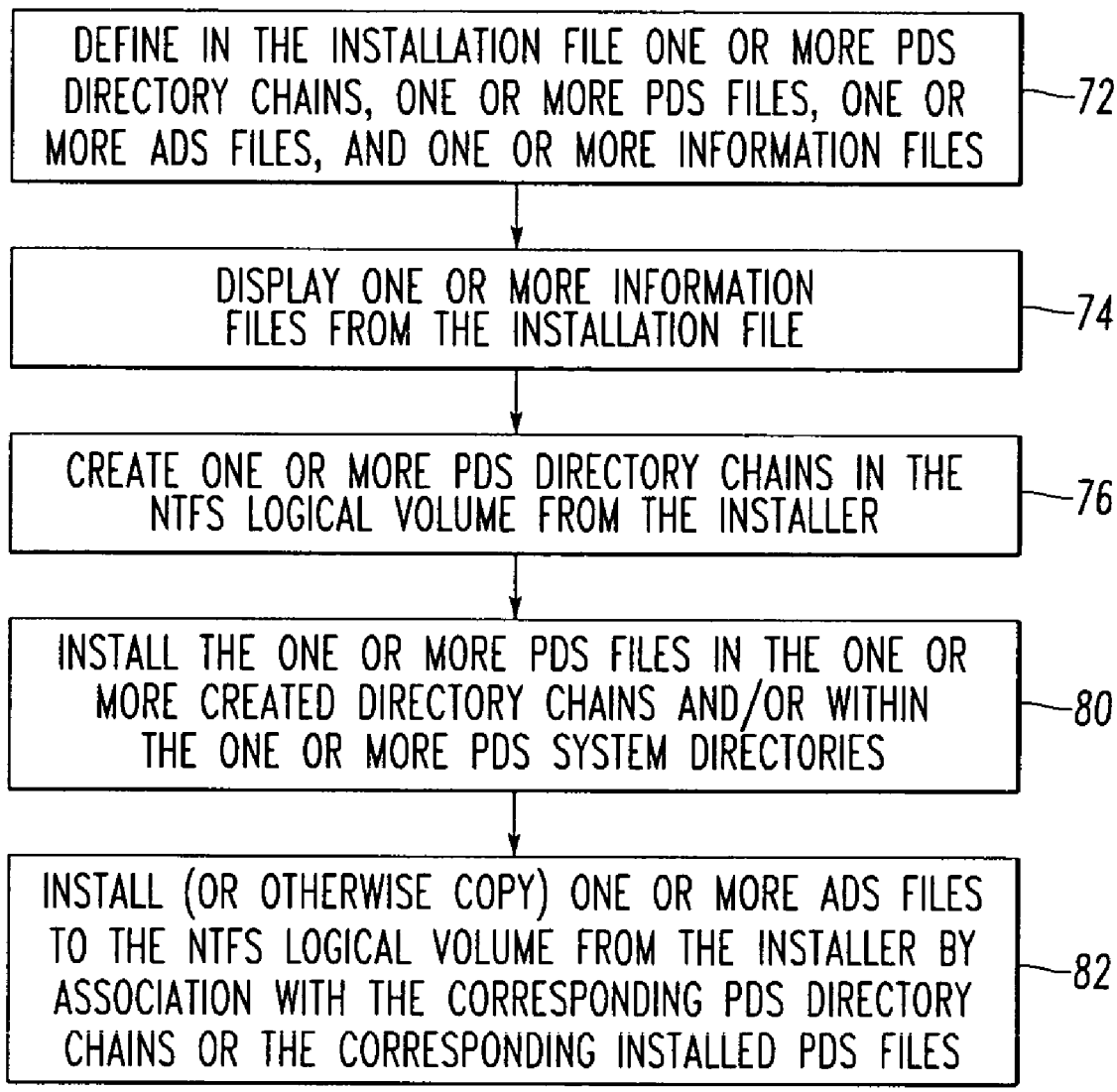
FIG. 4 is a flow chart of an installation process to create one or more Primary Data Stream (PDS) directory chains, to install one or more PDS files, and to install one or more Alternate Data Stream (ADS) files through association with the PDS directory chains and/or the PDS files in accordance with another embodiment of the invention.

FIG. 4 shows a flowchart 70 of an example installation process, which employs the installation file 58 of FIG. 3. First, at 72, one or more PDS directory chains, such as 54 of FIG. 3, one or more PDS files, such as 46, one or more ADS files, such as 50, and one or more information files, such as 60,62,64, are defined in the installation file 58. Next, at 74, one or more of the information files, such as 60,62,64, are displayed from the installation file 58. For example, installation-specific information, such as the EULA 62, is displayed for the user that is conducting the installation. Then, at 76, one or more PDS directory chains, such as 54, are created in (or otherwise written to) the NTFS logical volume 42 from the installer 44 as PDS directory chains, such as 54'. Then, at 80, one or more PDS files, such as 46, are installed in the one or more created directory chains, such as 54', and/or within the one or more PDS system directories. For example, the PDS files, such as 46, are written or copied as the PDS files, such as 46', to the corresponding PDS directory chains, such as 54', in the NTFS logical volume 42 from the installer 44. Finally, at 82, one or more ADS files, such as 50, are installed (or otherwise copied) to the NTFS logical volume 42 from the installer 44, by association with the corresponding PDS directory chains, such as 54', or the corresponding installed PDS files, such as 46'.

In summary, as shown by the flowchart 70, the installer 44 creates one or more PDS directory chains 54', installs one or more PDS files 46', and installs one or more ADS files 50' through association with the PDS directory chains 54' and/or the PDS files 46'.

EXAMPLE 9

Although the installation file 58 of FIG. 3 and the installation flowchart 70 of FIG. 4 are shown, a wide range of installation files and/or installation sequences may be employed. For example, a wide range of instructions may be encoded within one or more installation file(s) in order to detail how to perform the installation. For example, this may detail what file(s) to display during the process, what PDS directory or directories to create, what PDS file(s) to copy to a PDS directory or directories, and what ADS file(s) to associate with what PDS file(s) and PDS directory or directories.

EXAMPLE 10

Many common types of files may be stored as an ADS file associated to a PDS directory chain or to a PDS file. Examples include: (1) installation logs used to alter or de-install software installations; (2) application configuration files used to set the working characteristics of a software environment; (3) error logs created within a software environment; (4) help information (e.g., files; documentation) that could be reverse-engineered by competitors; (5) files containing information that could be used by a competitor; (6) database information (e.g., tables; views; associated indexes) that are directly accessed within the software environment; and (7) files critical to the operation of the software environment that, if written as PDS files, could be duplicated to make illegal copies of such environment.

EXAMPLE 11

The Appendix, below, shows example software written in Microsoft® Visual C++ project form. This software file (e.g., 'ads_demo.c'), when suitably compiled and executed (e.g. as 'ads_demo.exe'), creates a PDS file (e.g., 'ads_demo.bin'), and then creates two associated ADS files (e.g., 'ads_demo.bin:ads_demo.log' and 'ads_demo.bin:ads_demo.cfg').

As a result, only a single file (e.g., entitled 'ads_demo.bin') is visible in the working directory after running the program, 'ads_demo.exe'. Also, the file 'ads_demo.bin' has two ADSs attached (e.g., 'ads_demo.bin:ads_demo.log' and 'ads_demo.bin:ads_demo.cfg').

EXAMPLE 12

Although Example 11 shows a .bin file as the PDS file, a wide range of PDS files may be employed. For example, the PDS file may be an executable file, such as 'ads_demo.exe', or a directory chain.

EXAMPLE 13

The contents (e.g., the associated data 48' from the ADS file 50' in the NTFS logical volume 42 of FIG. 3) of each ADS file, such as the two ADS files (e.g., 'ads_demo.bin:ads_demo.log'; 'ads_demo.bin:ads_demo.cfg') of Example 11, may be viewed using the Cygwin™ CAT utility by the following three commands: (1) cat ads_demo.bin; (2) cat ads_demo.bin:ads_demo.log; and (3) cat ads_demo.bin:ads_demo.cfg. Cygwin™ tools are marketed by Red Hat, Inc. of Research Triangle Park, N.C.

EXAMPLE 14

Alternatively, CrucialADS, which is marketed by Crucial Security of Fairfax, Va., may be employed to detect Alternate Data Streams in NTFS files and directories.

EXAMPLE 15

Alternatively, there are several other ways to view the contents of ADS, if the exact name of the stream is known. For example, the contents can be piped to the Windows® more command (e.g., C:\>more<afile.txt:hidden.txt) to provide, for example, "this is my hidden data" from the corresponding ADS file.

EXAMPLE 16

As an alternative to the DVD or CD-ROM drive 38, many installations occur after downloading an installer from an external drive or source, such as the Internet. The downloaded installer may either directly install a software environment from within the downloaded file, or may install a software environment by automatically downloading components from the Internet.

EXAMPLE 17

As another alternative, a common area may be provided on a local communication network to store software installers. Users of that network, in turn, can install applications on their local system by running the installer from a network drive. No CD-ROM or DVD drive is required in these instances.

The disclosed method and system allow installation logs, application configuration data and any other application-specific information to be safely hidden from view and protected from unsafe deletion or modification by an installer, such as installer 44. In switching to an ADS model for software deployment, licensed users and software manufacturers will reduce the risk of data theft, data corruption, software environment failure due to system alteration, and unlicensed duplication of licensed material. The greatest potential value of ADS storage of data is to hide files to such a degree that they cannot be directly archived, compressed, backed up, viewed, scanned, altered or deleted.

While for clarity of disclosure reference has been made herein to the exemplary display 52 for displaying installation information, it will be appreciated that such information may be stored, printed on hard copy, be computer modified, or be combined with other data. All such processing shall be deemed to fall within the terms "display" or "displaying" as employed herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

APPENDIX

```c
//
// Filename: ads_demo.c
// Purpose : demonstrate creation of primary and alternate data streams
//
#include <windows.h>
#include <stdio.h>
void main( void )
{
    HANDLE   hPDS;
    HANDLE   hADS;
    DWORD    Retval;
    char     * Primary       = "ads_demo.bin";
    char     * ADS_log       = "ads_demo.bin:ads_demo.log";
    char     * ADS_cfg       = "ads_demo.bin:ads_demo.cfg";
    char     * Primary_out   = "ADS Demo Primary Data Stream";
    char     * ADS_log_out   = "ADS Demo Alternate Data Stream-Installation Logs";
    char     * ADS_cfg_out   = "ADS Demo Alternate Data Stream-Configuration";
//
// create a primary data stream for demonstration purposes
// in real life conditions, associate an ADS file with installed executable
//
hPDS = CreateFile
(
        Primary,
        GENERIC_WRITE,
        FILE_SHARE_WRITE,
        NULL,
        OPEN_ALWAYS,
        0,
        NULL
);
if      ( hPDS == INVALID_HANDLE_VALUE )
{
        printf( "Unable to create [%s]\n", Primary );
}
else
{
        WriteFile( hPDS, Primary_out, strlen(Primary_out), &Retval, NULL );
        CloseHandle( hPDS );
        printf( "Primary Data Stream [%s] Has Been Created\n", Primary );
        hADS = CreateFile
    (
            ADS_log,
            GENERIC_WRITE,
            FILE_SHARE_WRITE,
            NULL,
            OPEN_ALWAYS,
            0,
            NULL
    );
    if(     hADS == INVALID_HANDLE_VALUE )
    {
            printf( "Unable to create [%s]\n", ADS_log );
    }
        else
        {
            WriteFile( hADS, ADS_log_out, strlen(ADS_log_out), &Retval, NULL);
            CloseHandle( hADS );
            printf( "Alternate Data Stream [%s] Has Been Created\n", ADS_log );
        }
        hADS = CreateFile
        (
            ADS_cfg,
            GENERIC_WRITE,
            FILE_SHARE_WRITE,
            NULL,
            OPEN_ALWAYS,
            0,
            NULL
        );
        if(     hADS == INVALID_HANDLE_VALUE )
        {
            printf( "Unable to create [%s]\n", ADS_cfg );
        }
```

APPENDIX-continued

```
        else
        {
            WriteFile( hADS, ADS_cfg_out, strlen(ADS_cfg_out), &Retval, NULL);
            CloseHandle( hADS );
            printf( "Alternate Data Stream [%s] Has Been Created\n", ADS_cfg );
        }
    }
}
```

What is claimed is:

1. A method for secure installation and operation of software, said method comprising:
employing a New Technology File Structure logical volume;
employing an installer;
writing a Primary Data Stream file to said New Technology File Structure logical volume from said installer;
associating data with said Primary Data Stream file;
writing said associated data to said New Technology File Structure logical volume as an Alternate Data Stream file from said installer;
creating a Primary Data Stream directory chain;
writing said Primary Data Stream directory chain to said New Technology File Structure logical volume from said installer;
writing said Primary Data Stream file to said Primary Data Stream directory chain in said New Technology File Structure logical volume from said installer;
associating said data with said Primary Data Stream directory chain or said Primary Data Stream file by creating and closing said Alternate Data Stream file; and
installing said associated data to said New Technology File Structure logical volume as said Alternate Data Stream file from said installer.

2. The method of claim 1 further comprising
selecting said data from the group comprising an installation log, an application configuration file, an error log, help information, and database information.

3. The method of claim 1 further comprising
writing, reading or manipulating said Alternate Data Stream file from an application program after said writing said associated data.

4. The method of claim 1 further comprising
employing as said Primary Data Stream file an executable file.

5. The method of claim 1 further comprising
employing an installation file comprising said Primary Data Stream file, said Alternate Data Stream file, installation instructions, said Primary Data Stream directory chain, and an End User License Agreement.

6. The method of claim 5 further comprising
displaying said installation instructions and said End User License Agreement from said installation file.

7. The method of claim 1 further comprising
employing as said associated data first data;
employing as said Alternate Data Stream file a first Alternate Data Stream file;
employing second data;
associating said second data with said Primary Data Stream file; and
writing said associated second data to said New Technology File Structure logical volume as a second Alternate Data Stream file from said installer.

8. The method of claim 1 further comprising
displaying said associated data from said Alternate Data Stream file in said New Technology File Structure logical volume.

9. The method of claim 1 further comprising
employing an installation file;
defining in said installation file a Primary Data Stream directory chain, said Primary Data Stream file, said Alternate Data Stream file, and at least one information file;
displaying said at least one information file from said installation file;
creating said Primary Data Stream directory chain in said New Technology File Structure logical volume;
copying said Primary Data Stream file from said installation file to said Primary Data Stream directory chain in said New Technology File Structure logical volume; and
copying said Alternate Data Stream file from said installation file to said Primary Data Stream directory chain in said New Technology File Structure logical volume.

10. A computer system for secure installation and operation of software, said computer system comprising:
a processor;
a first drive adapted for access by said processor;
a second drive adapted for access by said processor, said second drive including a New Technology File Structure logical volume; and
an installer operatively associated with said first drive, said installer cooperating with said processor to write a Primary Data Stream file to said New Technology File Structure logical volume, associate data with said Primary Data Stream file, and write said associated data to said New Technology File Structure logical volume as an Alternate Data Stream file; and
wherein said installer cooperates with said processor to create a Primary Data Stream directory chain, to write said Primary Data Stream directory chain to said New Technology File Structure logical volume, to write said Primary Data Stream file to said Primary Data Stream directory chain in said New Technology File Structure logical volume, to associate said data with said Primary Data Stream directory chain or said Primary Data Stream file, and to install said associated data to said New Technology File Structure logical volume as said Alternate Data Stream file.

11. The computer system of claim 10 wherein said New Technology File Structure logical volume includes a directory chain or a system directory; and wherein said installer installs said Primary Data Stream file in said directory chain or said system directory of said New Technology File Structure logical volume.

12. The computer system of claim 10 where said data is selected from the group comprising an installation log, an application configuration file, an error log, help information, and database information.

13. The computer system of claim 11 wherein said New Technology File Structure logical volume includes an application program, which cooperates with said processor to write, read or manipulate said Alternate Data Stream file.

14. The computer system of claim 10 wherein said Primary Data Stream file is an executable file, which is adapted for execution by said processor.

15. The computer system of claim 10 wherein said installer comprises an installation file comprising said Primary Data Stream file, said Alternate Data Stream file, installation instructions, a Primary Data Stream directory chain, and an End User License Agreement.

16. The computer system of claim 15 wherein said processor includes a display; and wherein said installer cooperates with said processor to display said installation instructions and said End User License Agreement on said display.

17. The computer system of claim 10 wherein said processor includes a display; wherein said New Technology File Structure logical volume includes a display utility; and wherein said display utility cooperates with said processor to display said associated data from said Alternate Data Stream file in said New Technology File Structure logical volume on said display.

18. The computer system of claim 10 wherein said processor includes a display; wherein said installer comprises an installation file including a Primary Data Stream directory chain, said Primary Data Stream file, said Alternate Data Stream file, and at least one information file; and wherein said installer cooperates with said processor to display said at least one information file from said installation file to said display, to create said Primary Data Stream directory chain in said New Technology File Structure logical volume, to copy said Primary Data Stream file from said installation file to said Primary Data Stream directory chain in said New Technology File Structure logical volume, and to copy said Alternate Data Stream file from said installation file to said Primary Data Stream directory chain in said New Technology File Structure logical volume.

19. A method for secure installation and operation of software, said method comprising:
  employing a computer-readable medium including a New Technology File Structure logical volume;
  employing an installer;
  writing a Primary Data Stream file to said New Technology File Structure logical volume of said computer-readable medium from said installer;
  associating data with said Primary Data Stream file; and
  writing said associated data to said New Technology File Structure logical volume of said computer-readable medium as an Alternate Data Stream file from said installer;
  creating a Primary Data Stream directory chain;
  writing said Primary Data Stream directory chain to said New Technology File Structure logical volume from said installer;
  writing said Primary Data Stream file to said Primary Data Stream directory chain in said New Technology File Structure logical volume from said installer;
  associating said data with said Primary Data Stream directory chain or said Primary Data Stream file by creating and closing said Alternate Data Stream file; and
  installing said associated data to said New Technology File Structure logical volume as said Alternate Data Stream file from said installer.

* * * * *